US012766881B2

(12) United States Patent
Branca et al.

(10) Patent No.: US 12,766,881 B2
(45) Date of Patent: Oct. 20, 2026

(54) HUB-BEARING ASSEMBLY FOR A WHEEL OF A MOTOR VEHICLE

(71) Applicant: AKTIEBOLAGET SKF, Gothenburg (SE)

(72) Inventors: Giancarlo Branca, Rivoli (IT); Marco Romanetto, Pianezza (IT); Fulvio Carlo Nicastri, Garzigliana (IT)

(73) Assignee: AKTIEBOLAGET SKF, Gothenburg (SE)

( * ) Notice: Subject to any disclaimer, the term of this patent is extended or adjusted under 35 U.S.C. 154(b) by 156 days.

(21) Appl. No.: 18/639,123

(22) Filed: Apr. 18, 2024

(65) Prior Publication Data

US 2024/0359504 A1 Oct. 31, 2024

(30) Foreign Application Priority Data

Apr. 26, 2023 (IT) ........................ 102023000008121

(51) Int. Cl.
*B60B 27/00* (2006.01)
*F16C 19/18* (2006.01)
*F16C 35/073* (2006.01)

(52) U.S. Cl.
CPC ........ *B60B 27/0005* (2013.01); *F16C 35/073* (2013.01); *F16C 19/185* (2013.01); *F16C 2326/02* (2013.01)

(58) Field of Classification Search
CPC ...... F16C 35/063; F16C 35/073; F16C 43/04; F16C 2326/02; B60B 27/0026;
(Continued)

(56) References Cited

U.S. PATENT DOCUMENTS

| | | | |
|---|---|---|---|
| 5,984,422 | A | 11/1999 | Seifert |
| 6,170,628 | B1 | 1/2001 | Bigley |

(Continued)

FOREIGN PATENT DOCUMENTS

| | | | |
|---|---|---|---|
| CN | 10281565 | A † | 12/2014 |
| CN | 215058932 | U † | 12/2021 |

(Continued)

OTHER PUBLICATIONS

Machine Translation of CN-102815165-A (Year: 2012).*

(Continued)

*Primary Examiner* — Alan B Waits
(74) *Attorney, Agent, or Firm* — J-TEK LAW PLLC; Scott T. Wakeman; Mark A. Ussai

(57) ABSTRACT

A hub-bearing assembly includes a stationary radially outer ring, a flanged hub extending into an interior of the radially outer ring and configured to rotate relative to the radially outer ring, and a radially inner ring mounted on the flanged hub and axially abutting a portion of the flanged hub. A toothed sleeve is mounted to the hub axially inward of and adjacent to the radially inner ring and is rotationally fixed relative to the flanged hub. An auxiliary ring is mounted on the flanged hub in contact with the toothed sleeve. The flanged hub includes an axially inner rolled edge in contact with the auxiliary ring and configured to maintain a preload on the radially inner ring, and the auxiliary ring is configured to accommodate deformations induced by the formation of the rolled edge.

13 Claims, 3 Drawing Sheets

(58) Field of Classification Search
CPC ............ B60B 27/0036; B60B 27/0042; B60B 27/0078; B60B 27/0084; B60B 35/127; B60B 35/128; B60B 35/14; B60K 17/3515; B60K 23/08; B60K 23/0808; B60K 2023/0816–0891
See application file for complete search history.

(56) References Cited

U.S. PATENT DOCUMENTS

| | | | |
|---|---|---|---|
| 6,299,360 | B1 | 10/2001 | Dougherty |
| 6,557,660 | B2 † | 5/2003 | Averill |
| 6,676,226 | B2 * | 1/2004 | Hahn .................. G07F 17/3234 301/105.1 |
| 8,047,724 | B2 | 11/2011 | Kamikawa et al. |
| 8,267,593 | B2 | 9/2012 | Suma |
| 11,535,098 | B2 | 12/2022 | Badino |
| 12,304,238 | B2 | 5/2025 | Branca et al. |
| 2007/0217728 | A1 | 9/2007 | Kashiwagi et al. |
| 2008/0258539 | A1 | 10/2008 | Schumacher |
| 2008/0258541 | A1 * | 10/2008 | Kamikawa ............ B60B 27/001 301/131 |
| 2014/0103702 | A1 | 4/2014 | Komori |
| 2021/0170788 | A1 | 6/2021 | Falossi et al. |
| 2022/0324320 | A1 | 10/2022 | Badino |
| 2023/0331040 | A1 * | 10/2023 | Branca ................ B60B 27/0036 |

FOREIGN PATENT DOCUMENTS

| | | | |
|---|---|---|---|
| EP | 3150873 | A1 | 4/2017 |
| EP | 4070977 | A1 | 10/2022 |
| JP | 2014-020404 | † | 2/2014 |

OTHER PUBLICATIONS

Machine Translation of JP-2014020404-A (Year: 2014).*
Machine Translation of CN-215058932-U (Year: 2021).*
Written Opinion and Search Report from the Italian Patent Office mailed Nov. 8, 2023 in related application No. 102023000008121, and translation thereof.
Written Opinion and Search Report from the Italian Patent Office dated Dec. 21, 2022 in related application No. IT 102022000007313, and machine translation of the Search Report (the Written Opinion was mailed in English).

* cited by examiner
† cited by third party

HUB-BEARING ASSEMBLY FOR A WHEEL OF A MOTOR VEHICLE

CROSS-REFERENCE

This application claims priority to Italian patent application no. 10 2023 000008121 filed on Apr. 26, 2023, the contents of which are fully incorporated herein by reference.

TECHNOLOGICAL FIELD

The present disclosure is directed to a hub-bearing assembly for a wheel of a motor vehicle. In particular, the assembly includes a bearing unit removably coupled to a constant velocity joint, and configured for use in motor vehicles provided with on-demand four-wheel drive.

BACKGROUND

A hub-bearing assembly fitted with a bearing unit to rotatably support a wheel of a motor vehicle on a suspension is known and commonly used. The bearing unit usually includes a pair of rolling bearings, but different bearing unit configurations are also evidently known.

In the prior art, the hub-bearing assembly comprises a flanged rotary hub mechanically connected to a rotary element of the motor vehicle, for example the wheel or the disc of a braking element, while the bearing unit comprises an outer ring, a pair of inner rings, one of which may be the flanged hub itself, and a plurality of rolling bodies, for example balls. All of these components have axial symmetry about the axis of rotation of the rotary elements, for example the flanged hub and the inner rings of the bearing unit.

The flanged hub receives a drive torque from a bell housing of the constant velocity joint via a splined coupling. In particular, the bell housing of the constant velocity joint is provided with axially outer teeth, while a toothed sleeve with axially outer teeth is fastened to the hub. A ring gear with axially inner teeth transmits motion from the constant velocity joint to the hub of the wheel, and the ring gear is provided with a system for disconnecting from the toothed sleeve of the hub. Consequently, when the ring gear is engaged with the toothed sleeve of the hub, motion is transmitted from the transmission shaft to the wheel of the motor vehicle, which then acts as a drive wheel. Conversely, when the ring gear is disengaged from the toothed sleeve of the hub, transmission of motion from the transmission shaft to the wheel is interrupted, and the wheel acts as a driven wheel.

In this configuration, bearings must be present between the hub and the constant velocity joint to enable the hub to rotate independently of the constant velocity joint. These bearings are typically radial ball bearings.

Consequently, the hub-bearing assembly with a system for disconnecting from the transmission shaft requires a flanged hub that is hollow inside and also requires the mounting of two (or more) radial ball bearings in a radially inner position with respect to the flanged hub. Furthermore, the axially inner radial ball bearing requires an axial shoulder to define the axial position of the constant velocity joint with respect to the hub-bearing assembly.

Finally, by means of a known process such as orbital roll forming, an axially inner appendage of the flanged hub is deformed to axially preload and clamp both the toothed sleeve and the radially inner ring (mounted on the flanged hub) in relation to the flanged hub itself.

Roll forming the material of the flanged hub directly onto the inner toothed sleeve has some drawbacks. For example, in this process, the rolled material is deformed and pressed against the discontinuous surface of the toothed sleeve (the internal profile of the toothed sleeve has empty spaces between the teeth). This creates non-uniform deformations and concentrations of stresses on the area of the deformed material of the flanged hub in contact with the toothed sleeve.

In addition, the deformations induced on the radially inner ring alter the raceway thereof by modifying the osculation thereof, i.e. the ratio between the radius of curvature of the raceway and the external diameter of the rolling bodies. This increases the fatigue stresses between the rolling bodies and the raceway, reducing the service life of the hub-bearing assembly. Roll forming the material of the flanged hub on the toothed sleeve also induces a deformation (in particular an expansion) of the external toothed profile of the toothed sleeve. When in use, this can cause coupling problems (caused by unwanted interference) between the toothed sleeve and the ring gear of the disconnection system. Finally, the orbital roll forming process causes the seat of the axially inner radial ball bearing of the flanged hub to contract, which can potentially cause problems relating to the positioning of the bearing in the seat and to the preloading thereof.

In addition to these drawbacks, the machining of the seat of the axially inner radial ball bearing of the flanged hub requires a relief groove close to the axial shoulder.

This requirement, in combination with the shape and position of the relief groove formed directly in the flanged hub, as well as the narrow section of the flanged hub formed in the same zone (the narrow section results from the need to form a toothed coupling profile between the flanged hub and the toothed sleeve) result in high stress in the relief groove and a short fatigue life of the component.

SUMMARY

To resolve the technical problems set out above, one aspect of the present disclosure is to provide a hub-bearing assembly coupled to a system for disconnecting from the transmission shaft, including a ring interposed between the rolled edge of the hub and the toothed sleeve, so that the ring can support the material of the rolled edge and absorb the deformations induced by the orbital roll forming process.

Advantageously, the flanged hub can also be provided with a radially inner spacer acting as axial shoulder for the radial ball bearings. The use of a spacer to provide the axial shoulder of the radial ball bearing enables a different internal shape of the flanged hub. This is because the relief groove for the machining of the flanged hub can be formed in an axially outer position with respect to the spacer, and therefore in a less stressed zone of the flanged hub, and in any case sufficiently far away from the narrow, and therefore more critical, section of the flanged hub.

BRIEF DESCRIPTION OF THE DRAWINGS

Non-limiting embodiments of the invention are described below with reference to the attached drawings.

DETAILED DESCRIPTION

By way of non-limiting example, the present disclosure is described below with reference to a hub-bearing assembly for motor vehicles provided with a bearing unit.

Figure 1:
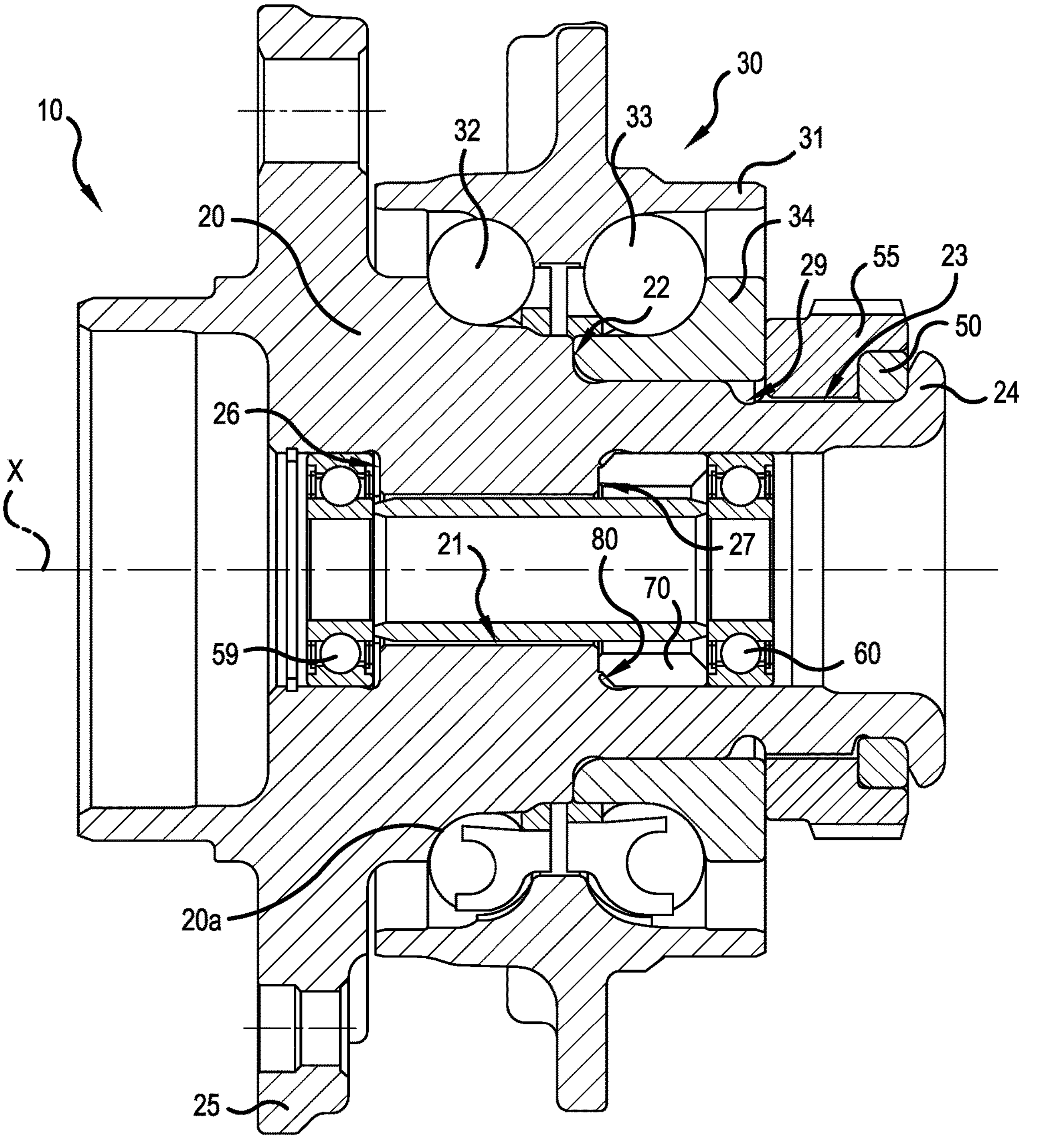
FIG. 1 is a cross sectional view of a hub-bearing assembly that can be provided with a system for disconnecting the assembly from a transmission shaft according to one embodiment of the present disclosure.

With reference to FIG. 1, a hub-bearing assembly according to a preferred embodiment of the disclosure is denoted as a whole using reference sign 10. The figure shows a detail of an example arrangement.

When in use, the hub-bearing assembly 10 is interposed between a wheel and a frame, both of which are known and not illustrated, of a vehicle, and may be selectively coupled to a constant velocity joint, which is known and not illustrated, via a transmission device, which is also known and not illustrated, to transmit or otherwise the drive torque to the respective wheel (not illustrated).

The hub-bearing assembly comprises a rotary flanged hub 20 and a bearing unit 30 having a central axis of rotation X, a stationary radially outer ring 31, and a radially inner ring. The radially inner ring is defined by a portion 20*a* of the flanged hub 20 and a further radially inner ring 34 mounted on and rigidly connected to the flanged hub 20, both of the radially inner rings 20*a*, 34 being rotatable with respect to the radially outer ring 31 as a result of the interposition of two rows of rolling bodies 32, 33, in this case balls between the inner and outer rings.

Throughout the present description and in the claims, terms and expressions indicating positions and orientations, such as "radial" and "axial", are to be understood with reference to the central axis of rotation X of the bearing unit 30. On the other hand, expressions such as "axially outer" and "axially inner" refer to the mounted state of the hub-bearing assembly, and in this case preferably refer to a wheel side and to a side opposite the wheel side respectively.

To simplify the graphical representation, reference signs 32, 33 are used to denote both individual balls and rows of balls. Again for the sake of simplicity, the term "ball" shall be used by way of example in the present description and in the attached drawing instead of the more generic term "rolling body" (and the same reference signs shall be used).

The flanged hub 20 has a central through-hole 21 that extends along the axis X that is configured to be engaged by the constant velocity joint and comprises, on an axially outer side thereof, a flange 25 for fastening the hub-bearing assembly 10 to a wheel of a vehicle, and, on an axially inner side thereof, a rolled edge 24 (obtained, e.g., by orbital roll forming) that is designed to axially preload both the inner ring 34 and a toothed sleeve 55 against a radially outer shoulder 22 of the flanged hub 20. The toothed sleeve 55, which is mounted close to the inner ring 34, is coupled to a toothed profile 23 of the flanged hub 20.

Bearings are required between the hub and the constant velocity joint to enable the flanged hub 20 to rotate independently of the constant velocity joint when the flanged hub 20 is disengaged from the constant velocity joint. In the present embodiment, the flanged hub 20 has a first radially inner shoulder 26 and a second radially inner shoulder 27 formed inside the central through-hole 21, close to which are mounted at least two sets of radial ball bearings 59, 60 (exactly two sets in the configuration illustrated in FIG. 1). The two sets of radial ball bearings 59, 60 are mounted in a radially inner position with respect to the flanged hub 20. In particular, the first radial ball bearings 59 are mounted in an axially outer position against the first shoulder 26 and the second radial ball bearings 60 are mounted in an axially inner position against the second shoulder 27. There may also be an additional set of radial ball bearing in the axially inner position.

Figure 2:
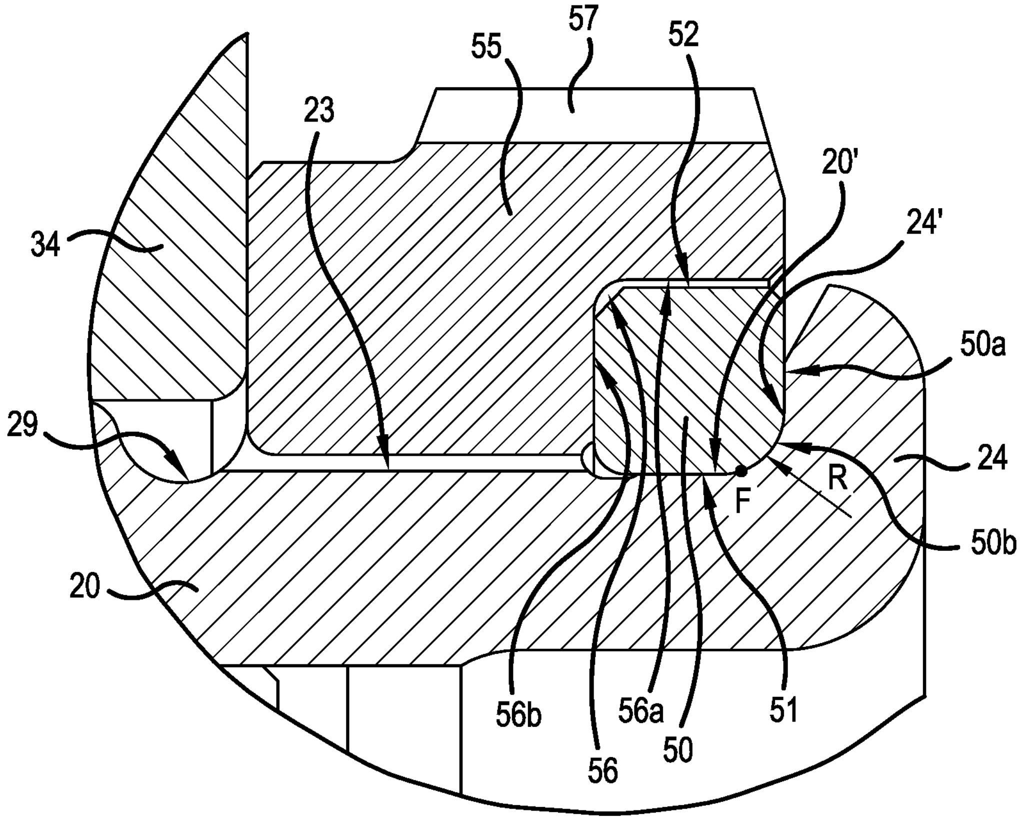
FIG. 2 is a detail view of a first portion the hub-bearing assembly of FIG. 1.

According to the present disclosure and also with reference to FIG. 2, a ring 50 of rectangular section, sometimes referred to as an "auxiliary ring," is provided between the rolled edge 24 of the flanged hub 20 and the toothed sleeve 55. Therefore, according to the disclosure, the rolled edge 24 of the flanged hub 20 axially preloads and blocks three axially adjacent components against the shoulder 22 of the flanged hub 20, namely, the radially inner ring 34, the toothed sleeve 55 and the ring 50.

The ring 50, which has a solid rectangular section, supports the material of the rolled edge 24. Indeed, whereas in the prior art the material of the rolled edge is deformed and pushed against the discontinuous surface of the toothed sleeve, according to the present disclosure the material of the rolled edge 24 is pressed against an axially inner annular surface 50*a* of the ring 50, the annular surface resulting from the fact that the ring 50 has a rectangular section, and not for example a circular section. The annular surface 50*a* is a solid surface and is continuous for 360°, i.e. it has no gaps. Consequently, the ring 50 of rectangular section is able to absorb the deformations induced by the orbital roll forming process without these deformations being transferred to the toothed sleeve 55.

Advantageously and more specifically, the ring 50 includes the axially inner annular surface 50*a*, a radially inner cylindrical surface 51, and an axially inner, radially inner curvilinear surface 50*b* that has a radius of curvature R and that is located between the annular surface 50*a* and to the cylindrical surface 51.

Advantageously, the connection radius R is selected so that an axially outer, radially outer profile 24' of the plastically deformed rolled edge 24 can be fitted to the radially inner, axially inner profile of the ring 50 formed by the annular surface 50*a* and the cylindrical surface 50*b*. Indeed, the material of the rolled edge 24 is deformed and pressed against the annular surface 50*a* and the curvilinear surface 50*b*, both of which are continuous and have no gaps around the full 360° of the circumference. The combination of the two surfaces 50*a*, 50*b* provides a broad support area for the material of the rolled edge 24, and therefore reduces a concentration of stresses on the rolled edge 24 of the flanged hub 20 as compared to the stresses that would occur without the use of the ring 50.

The ring 50 is accommodated in a seat (recess) 56 of the toothed sleeve 55, the seat 56 comprising a radially inner cylindrical surface 56*a* and an axially inner annular surface 56*b* that blocks axial movement of the ring 50.

The fit between the cylindrical surface 56*a* of the toothed sleeve 55 and a radially outer cylindrical surface 52 of the ring 50 is preferably a clearance fit. This clearance fit enables the ring 50, after being pressed axially by the orbital roll forming process, to freely expand radially without the radial expansion being transferred to the toothed sleeve 55. This prevents the external toothed profile 57 of the toothed sleeve 55 from expanding radially, thereby avoiding potential coupling problems between the toothed sleeve and the ring gear of the disconnection system during operation.

Advantageously, the coupling between the ring 50 and the flanged hub 20, in particular between the radially inner cylindrical surface 51 of the ring 50 and a radially outer cylindrical surface 20' of the flanged hub 20, may be a coupling with slight interference (on the borderline, or even with minimum clearance) on the basis of the actual dimensions of the two components according to the respective specified tolerances. Preferably, the coupling may vary between a diametric clearance of 0.01 mm to an interference of 0.05 mm (in all cases relative to the diameters of the two coupling surfaces). Indeed, greater interference would excessively deform the ring 50 and, in particular, would increase the external diameter thereof with a consequent impact on the coupling between the cylindrical surface 56*a* of the toothed sleeve 55 and the cylindrical surface 52 of the ring 50, for which adequate clearance is required, as mentioned above. Furthermore, low interference values require low press-fitting forces and consequently simplify assembly, while guaranteeing that the components are centered and that the stresses caused by press-fitting both on the ring 50 and on the neighboring areas of the flanged hub 20 are reduced.

Advantageously, the profile of the rolled edge 24 remains absolutely unchanged from rolled edges formed on conventional wheel hubs. In particular, the diameter of the cylindrical surface 20' on which lies the bending point F from which the rolled edge 24 bends radially outwards remains unchanged. This feature enables the internal geometry of the flanged hub 20 to remain unchanged, and does not reduce the diameter of the central hole 21 on which the shoulders 26, 27 are formed for the radial ball bearings 59, 60. Consequently, the disclosed arrangement does not adversely affect the structural strength of the flanged hub 20 or the available internal radial space. Consequently, the size of the radial ball bearings also remains unchanged.

Figure 3:
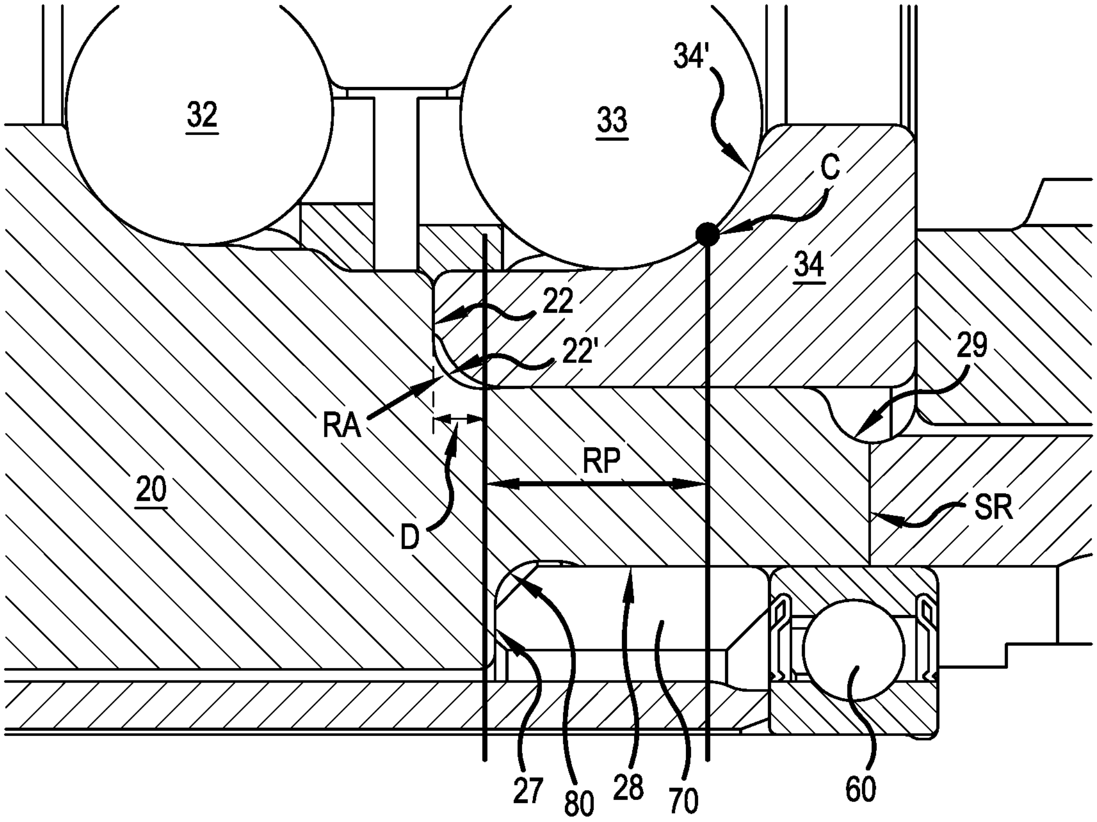
FIG. 3 is a detail view of a second portion of the hub-bearing assembly of FIG. 1.

With reference to FIG. 3, the axial stop for the second radial ball bearing 60 is advantageously formed by a spacer 70 located radially inside the flanged hub 20 and axially outside the radial ball bearing 60. The spacer 70 is in turn axially blocked against the second axial shoulder 27 of the flanged hub 20.

More specifically, the two radial bearings 59, 60 and the spacer 70 can be pressed by a ring (known and not illustrated) against the shoulders 26, 27, thereby exerting axial compression forces through the outer rings of the bearings 59, 60 and the spacer 70 onto the flanged hub 20 that, in response to the stresses transmitted by the wheel, generate reactive forces on the shoulders 26, 27 and in particular on the axially inner second shoulder 27, since it is located in the part of the flanged hub 20 with a radial section SR of reduced thickness. Indeed, this radial section SR coincides with a radially outer relief groove 29 of the flanged hub 20 that is required to machine the toothed coupling profile 23 between the flanged hub 20 and the toothed sleeve 52, and therefore necessarily has a reduced thickness.

The presence of the spacer 70 helps to improve the performance under stress of the geometry of the flanged hub 20. Indeed, to enable grinding operations to be carried out on the radially inner seat 28 of the flanged hub 20, which accommodates the second radial ball bearing 60 and the spacer 70, a relief groove 80 has to be defined between the seat 28 and the second axial shoulder 27 of the flanged hub 20. The relief groove 80 is therefore axially outside the seat 28 and radially inside the entire flanged hub 20. The presence of the spacer 70 enables the relief groove 80 to be positioned sufficiently far away from the radial section SR of reduced thickness of the flanged hub 20 (a more critical section in terms of stress). This enables the relief groove 80 to be designed with greater freedom, for example with a sufficiently large radius R, but primarily does not concentrate stresses in the vicinity of the narrow section SR of the flanged hub 20.

Consequently, the inclusion of the spacer 70, which is used as an axial shoulder for the axially inner radial ball bearing 60, is primarily intended to enable the provision of a radially inner relief groove 80 that is different in shape and position compared to the relief groove that would be possible to provide without the spacer 70.

This resolves several structural criticalities. Indeed, if there were no spacer, the radially inner relief groove would coincide (be aligned) with the radial ball bearing 60 and would therefore be in a position axially "facing" the radially outer relief groove 29. Furthermore, if the radially inner relief groove coincides with the radial ball bearing, the shape therefore would be conditioned by the geometry of the radial ball bearing, with very limited axial length and radius (for example, axial length in the order of 2 mm and radius in the order of 0.8 mm). All of this creates a very reduced narrow section SR of the flanged hub, and a notch effect caused by the presence of the radially inner relief groove.

The flanged hub is subjected to high bending loads in this zone, which generate high stresses that have an adverse effect on the service life of the flanged hub itself.

Conversely, the inclusion of the spacer 70 provides numerous advantages. For one, the radially inner relief groove 80 is provided in a more axially outer position, which is therefore further away from the radially outer relief groove 29 and the narrow section SR. In addition, the geometry of the relief valve 80 is characterized by larger radii and a greater overall length, with a consequent reduction in the notch effect. When required by the application, it is also possible to include an axially inner second radial ball bearing beside the first ball bearing without modifying the flanged hub but by merely reducing the axial dimension of the spacer 70. The second radial ball bearing may be useful where one ball bearing is not enough to withstand the stresses coming from the constant velocity joint.

Figure 4:
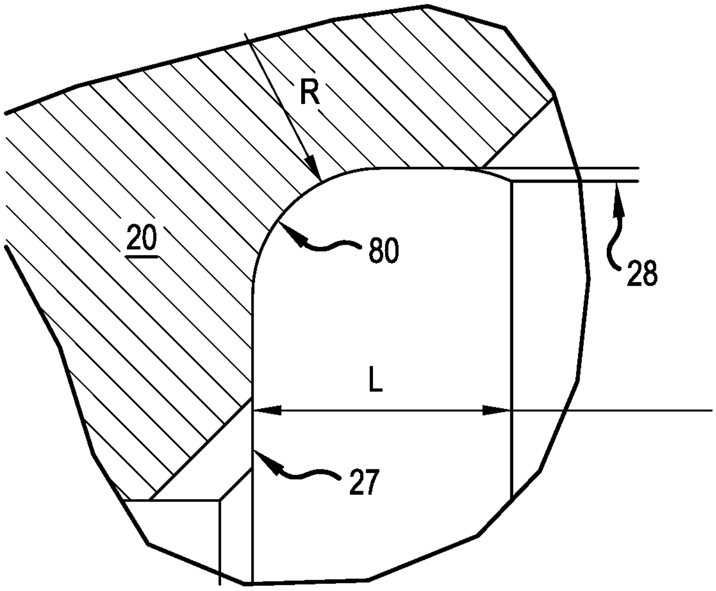
FIG. 4 is a detail view of a radially inner relief groove of a flanged hub of the hub-bearing assembly in FIG. 1.

With reference to FIG. 4, one key geometric parameter for optimizing the relief groove 80 and eliminating the structural problems of the flanged hub is the geometry of the groove itself. The radius R of the relief groove 80 should preferably be between 1.8 mm and 2.2 mm, while the axial length L can preferably vary between 3.8 mm and 4.2 mm. A second geometric parameter is the axial position of the relief groove 80. The limit positions, both on the axially inner side and the axially outer side, can advantageously be identified to avoid structural criticalities. In particular, the axially inner limit position of the relief groove 80 could coincide with the projection on the axis X of rotation of the pressure center C between the rolling bodies 33 and the raceway 34' of the radially inner ring 34, since the forces coming from the external loads are mainly discharged in this zone.

Furthermore, the axially outer limit position of the relief groove 80 could be defined at a distance D of between 2.4 mm and 2.6 mm in an axially inward direction with respect to the shoulder 22 of the flanged hub 20 that forms the stop of the radially inner ring 34 on the flanged hub 20. This prevents the relief groove 80 from being aligned with the shoulder 22 and with the adjacent connection 22*b* of the flanged hub 20, so as not to generate increased stress at the radius RA of the connection 22*b*, as deduced from the results of the structural analyses carried out.

Consequently, the axial position of the relief groove 80 is inside the stretch RP defined by the two limit positions mentioned above and indicated by the double arrow in FIG. 3.

In short, the adoption of the ring 50 between the rolled edge 24 of the flanged hub 20 and the toothed sleeve 55 provides the a plurality of advantages. These include the rolled material being deformed and pressed against a continuous surface with no gaps (about the full 360° of the circumference). This prevents discontinuities in the material that could cause a concentration of stresses and potential starting points for cracks on the rolled edge 24, in particular in the vicinity of the bending point F from which the rolled edge 24 bends radially outwards. In addition, no deformations are induced on the radially inner ring 34 that could alter the raceway 34' thereof and/or modify the osculation thereof. Such deformations may also increase the fatigue stresses between the rolling bodies and the raceway and reduce the service life of the hub-bearing assembly. Also, as a result of the clearance fit between the ring 50 and the toothed sleeve 55, no radial expansion is induced in the external toothed profile 57 of the toothed sleeve 55, thereby avoiding any malfunction (failed or difficult coupling) between the toothed sleeve and the ring gear of the disconnection system during operation. Finally, there is a substantial reduction in stresses and consequently deformations of the seat of the axially inner radial ball bearing of the flanged hub.

The use of the spacer 70 together with the ring 50 provides further advantages. These include a greater robustness of the flanged hub 20 in the zone between the shoulder 27 and the rolled edge 24, i.e. in the most structurally stressed zone, improving the capacity thereof to withstand loads. Also, the zone of the relief groove does not require local thermal treatment, which has a positive impact on the process and resulting costs. Furthermore, the solution is flexible in that the length of the spacer can be modified to enable two axially inner radial ball bearings to be inserted without modifying the design of the flanged hub. Indeed, the decision to use one or two axially inner radial ball bearings (naturally in addition to the axially outer radial ball bearing) can be taken at any stage of development without resulting in design modifications to the flanged hub.

In addition to the embodiment of the disclosure as described above, it is to be understood that there are numerous other variants. It is also to be understood that the embodiments are solely exemplary and do not limit the scope of the disclosure, its applications, or its possible configurations. Indeed, although the above description enables the person skilled in the art to carry out the present disclosure according to at least one example embodiment thereof, many variants of the described components can also be used without thereby departing from the scope of the disclosure as defined in the attached claims, which should be understood literally and/or according to the legal equivalents thereof.

What is claimed is:

1. A hub-bearing assembly comprising:
- a rotation axis;
- a stationary radially outer ring;
- a flanged hub extending into an interior of the radially outer ring and configured to rotate around the rotation axis and relative to the radially outer ring;
- a radially inner ring mounted on the flanged hub and axially abutting a portion of the flanged hub;
- a toothed sleeve mounted axially inward of and adjacent to the radially inner ring, the toothed sleeve being rotationally fixed relative to the flanged hub;
- an auxiliary ring mounted on the flanged hub in contact with the toothed sleeve,
- wherein the flanged hub includes an axially inner rolled edge in contact with the auxiliary ring and configured to maintain a preload on the radially inner ring;
- wherein the auxiliary ring is configured to accommodate deformations induced by a formation of the rolled edge,
- wherein a through-hole of the flanged hub includes a first radially inner shoulder and second radially inner shoulder and a first radial ball bearing in the through-hole and at least one second radial ball bearing in the through-hole, and a radially outer first relief groove surrounding the through-hole, and
- wherein the hub-bearing assembly further includes a spacer mounted in the through-hole axially between and in contact with the at least one second radial ball bearing and the second radially inner shoulder.

2. The assembly according to claim 1,
- wherein the auxiliary ring has a radially outer cylindrical surface, a radially inner cylindrical surface parallel to the radially outer cylindrical surface, an axially inner annular surface, an axially outer annular surface parallel to the axially inner annular surface and a curvilinear surface between the axially inner annular surface and the radially inner cylindrical surface.

3. The assembly according to claim 2,
- wherein the toothed sleeve includes an annular recess forming a seat for the auxiliary ring, the seat having a radially inwardly facing cylindrical surface and an axially inwardly facing annular surface, and
- wherein the auxiliary ring is mounted in the recess.

4. The assembly according to claim 3,
- wherein the auxiliary ring and the toothed sleeve are configured such that a radial gap exists between the inwardly facing cylindrical surface of the toothed sleeve and the radially outer cylindrical surface of the auxiliary ring.

5. The assembly according to claim 4,
- wherein a fit between the radially inner cylindrical surface of the auxiliary ring and a radially outer cylindrical surface of the flanged hub varies from a diameter clearance of 0.01 mm to a diameter interference of 0.05 mm.

6. The assembly according to claim 1,
- wherein the through-hole includes a second radially inner relief groove located axially outward of the radially outer first relief groove.

7. The assembly according to claim 6, wherein the at least one second radially ball bearing is a single ball bearing.

8. The assembly according to claim 6, wherein the at least one second radially ball bearing is exactly two second ball bearings.

9. The assembly according to claim 1,
- including a first row of rollers between a raceway formed on the flanged hub and a first raceway formed on the radially outer ring, and
- a second row of rollers between a raceway formed on the radially inner ring and a second raceway formed on the radially outer ring.

10. A method of assembling a bearing hub assembly comprising:
- inserting a flanged hub having a through-hole into a stationary radially outer ring;

mounting a radially inner ring on the flanged hub in axial abutment with a portion of the flanged hub;

mounting a toothed sleeve on the flanged hub axially inward of and adjacent to the radially inner ring such that the toothed sleeve is rotationally fixed relative to the flanged hub;

mounting an auxiliary ring on the flanged hub in contact with the toothed sleeve, forming a rolled edge on the flanged hub such that the rolled edge contacts the auxiliar ring and maintains a preload on the radially inner ring and accommodates deformations induced by a formation of the rolled edge, mounting a first radial ball bearing in the through-hole in contact with a first shoulder of the through-hole, mounting a spacer in the through-hole in contact with a second shoulder of the through-hole, and mounting a second radial ball bearing in the through-hole in contact with the spacer.

11. The method according to claim 10, wherein the auxiliary ring has a radially outer cylindrical surface, a radially inner cylindrical surface parallel to the radially outer cylindrical surface, an axially inner annular surface, an axially outer annular surface parallel to the axially inner annular surface and a curvilinear surface between the axially inner annular surface and the radially inner cylindrical surface.

12. The method according to claim 11, wherein the toothed sleeve includes a recess; and wherein the method includes mounting the auxiliary ring in the recess.

13. The method according to claim 10, further including mounting a first row of rollers between a raceway formed on the flanged hub and a first raceway formed on the radially outer ring, and mounting a second row of rollers between a raceway formed on the radially inner ring and a second raceway formed on the radially outer ring.

* * * * *